United States Patent
Nock et al.

(10) Patent No.: US 6,513,115 B2
(45) Date of Patent: *Jan. 28, 2003

(54) SYSTEM FOR RECONFIGURING AN EXISTING SERVER PROCESS WITHOUT ENDING AND RESTARTING

(75) Inventors: Clifton Malcolm Nock, Rochester, MN (US); Schuman M. Shao, Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/441,582

(22) Filed: Nov. 17, 1999

(65) Prior Publication Data

US 2002/0174331 A1 Nov. 21, 2002

(51) Int. Cl.[7] .......................... G06F 1/24; G06F 15/177
(52) U.S. Cl. .......................... 713/100; 714/48; 709/221
(58) Field of Search ................................. 709/102, 201, 709/226, 229, 221; 713/100, 1, 2; 714/48

(56) References Cited

U.S. PATENT DOCUMENTS

| | | | | |
|---|---|---|---|---|
| 5,740,362 A | * | 4/1998 | Buickel et al. | 707/10 |
| 5,857,102 A | | 1/1999 | McChesney et al. | 395/653 |
| 6,021,262 A | * | 2/2000 | Cote et al. | 709/223 |
| 6,058,426 A | * | 5/2000 | Godwin et al. | 709/223 |
| 6,237,092 B1 | * | 5/2001 | Hayes, Jr. | 709/221 |
| 6,272,544 B1 | * | 8/2001 | Mullen | 709/103 |
| 6,353,844 B1 | * | 3/2002 | Bitar et al. | 709/102 |
| 6,442,685 B1 | * | 8/2002 | French et al. | 713/100 |

\* cited by examiner

Primary Examiner—Thomas Lee
Assistant Examiner—Thong Thai Tien Nguyen
(74) Attorney, Agent, or Firm—Moser, Patterson & Sheridan, L.L.P.; Gero G. McClellan

(57) ABSTRACT

The present invention is a method, program product, computer system and apparatus for configuring an existing server process without the need to end and restart the server process. Specifically, a new server process is started with updated configuration information. If an existing server process is currently running, then the new server process assumes the role of a client and initiates a configuration request. The configuration request contains the necessary information for the existing server process to update its "old" configuration to conform to the "new configuration" in accordance with the configuration request.

20 Claims, 3 Drawing Sheets

CONFIGURATION REQUEST  300

/* TYPE OF REQUEST-CONFIGURATION */

/* CONFIGURATION PARAMETERS: */

MAXIMUM CONNECTIONS = 10
   VERBOSE=5
   PRIORITY = 5

SYSTEM FOR RECONFIGURING AN EXISTING SERVER PROCESS WITHOUT ENDING AND RESTARTING

BACKGROUND OF THE INVENTION

1. Field of the Invention

The present invention relates to the field of information processing. More particularly, the invention relates to a method, program product and an apparatus for reconfiguring a "server process" without the need to restart the server process.

2. Background of the Related Art

Generally, a distributed computer system comprises a collection of loosely coupled machines (mainframe, workstations or personal computers) interconnected by a communication network. Through a distributed computer system, a user or client may access various servers to store information, print documents, access databases, acquire client/server computing or gain access to the Internet. These services often require software applications running on the user's desktop to interact with other applications that might reside on one or more remote machines. Thus, in a client/server computing environment, one or more clients and one or more servers, along with the operating system and various interprocess communication (IPC) methods or mechanisms, form a composite that permits distributed computation, analysis and presentation.

For example, in client/server applications, a "server process" is typically a software application or routine that is started on a well-known computer that, in turn, operates continuously, waiting to connect and service the requests from various clients. Thus, servers are broadly defined as computers, and/or application programs executing thereon, that provide various functional operations and data upon request. Clients are broadly defined to include computers and/or applications that issue requests for services from the server. Thus, while clients and servers may be distributed in various computers across a network, they may also reside in a single computer, with individual software applications providing client and/or server functions. Once a client has established a connection with the server, the client and server communicate using commonly-known or proprietary protocol defined and documented by the server.

In a client-server system, the server process provides various interfaces to clients for invoking actions on the server that provide the functionality requested by a client. When an action is invoked on the server, the server process operates in accordance with certain configuration information, such as the location of its data directory, the executable path name, and the like. Thus, most server processes have a certain amount of configuration information that is associated with them. Examples of some configuration information or options may include the maximum number of connections allowed, the priority associated with client request processing, or the level of security enforced when accepting client connections. From time to time, the configuration information of a given server process may be changed as needed by a server administrator, which may be a human operator or an automated process, in order to adapt to the needs of clients and/or the network.

However, one problem with current methods of configuring a server process is that the server process must be ended and then restarted in order to load and execute new configuration parameters. Consequently, the server process is inactive for a period of time during which the configuration parameters are activated. In a client-server system, it is desirable to be able to minimize, or more preferably, eliminate the downtime of a server process because access to that server process during this time is not possible, thereby preventing communication with clients. As a result, requests from clients to an inactive server process are queued for an indefinite time or, alternatively, are returned to the clients in the form of an error message indicating the unavailability of the server.

Therefore, a need exists in the art for a method and apparatus for configuring a server process without the need to end and restart the server process.

SUMMARY OF THE INVENTION

The present invention generally relates to a method, a program product, and an apparatus for configuring a server process without the need to end and restart the server process. Specifically, in one embodiment of the present invention, a new server process is started with updated configuration information. If an existing server process is not detected by the new server process, then the new server process simply starts accepting client connections. However, if an existing server process is currently running, then the new server process assumes the role of a client and, in turn, initiates a configuration request. The configuration request contains the necessary information for the existing server process to update its "old" configuration to conform with the "new configuration" in accordance with the configuration request. Once the configuration request has been serviced by the existing server process, the new server process ends and informs the server administrator that an existing server process has been updated with the new configuration data.

One advantage of the present method for updating a server process is to provide a seamless process to update the configuration of an existing server process without interrupting service to the clients. Namely, the downtime associated with server process reconfiguration is eliminated. Additionally, the server administrator is no longer burdened with the need to confirm the existence of a current server process or its configuration. The present invention will automatically update the configuration of an existing server process or, if appropriate, becomes an existing server process and immediately accepts client connections.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention admit to other equally effective embodiments.

FIG. 3 is a data structure of a configuration request of the present invention.

DETAILED DESCRIPTION OF THE PREFERRED EMBODIMENT

As will be described in detail below, aspects of the preferred embodiment pertain to specific method steps implementable on computer systems. In an alternative embodiment, the invention may be implemented as a computer program product for use with a computer system. The programs defining the functions of the preferred embodiment can be delivered to a computer via a variety of signal-bearing media, which include, but are not limited to, (a) information permanently stored on non-writable storage media (e.g., read-only memory devices within a computer such as CD-ROM disks readable by a CD-ROM drive); (b) alterable information stored on writable storage media (e.g., floppy disks within a diskette drive or a hard-disk drive); (c) telephone networks, including wireless communications. Such transmission signals and signal-bearing media, when carrying computer-readable instructions that direct the functions of the present invention, represent alternative embodiments of the present invention.

Figure 1:
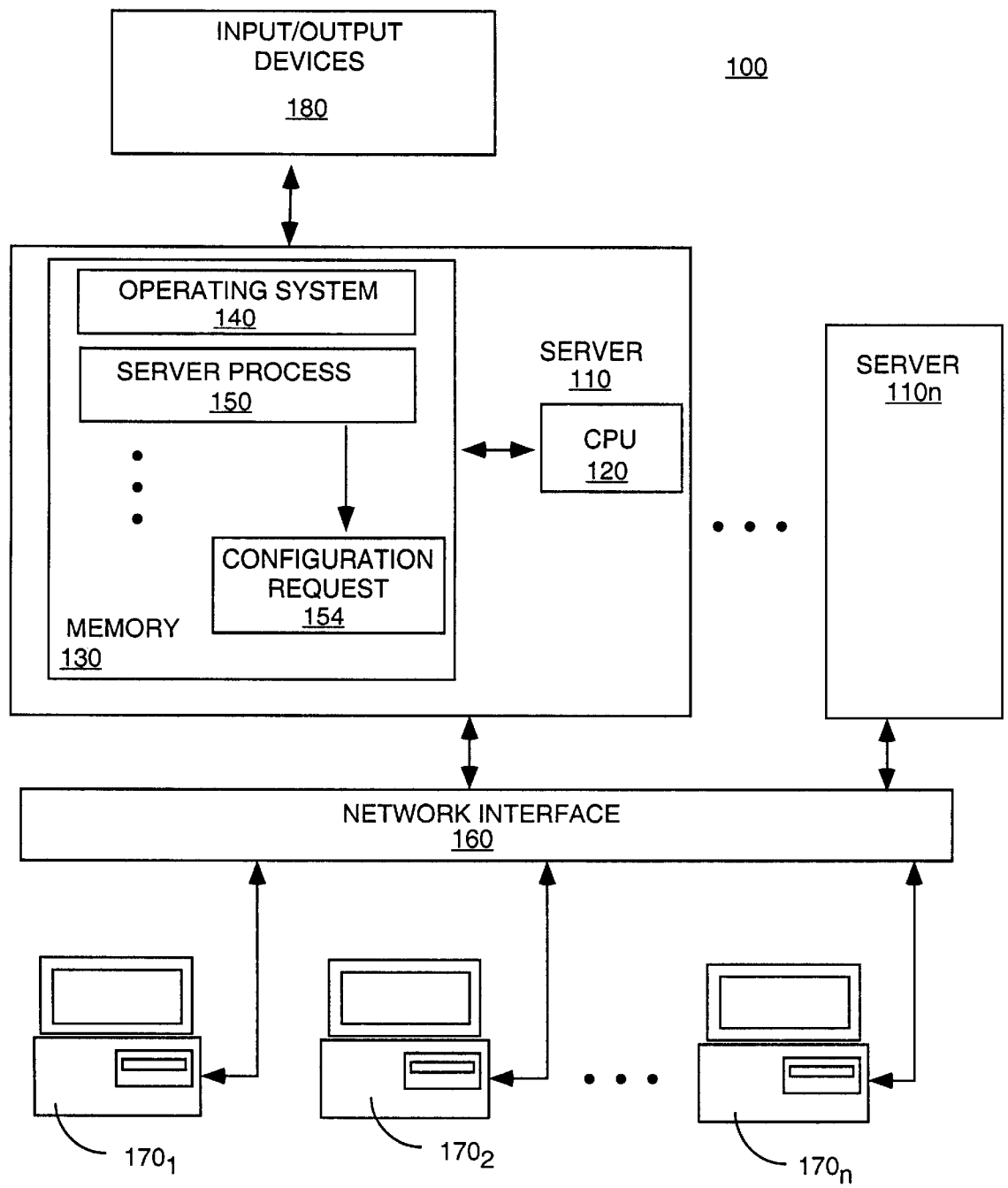
FIG. 1 is a block diagram showing a server-client system of the present invention.

FIG. 1 depicts a block diagram of a distributed computer system 100 that incorporates the server process configuration method of the present invention. The distributed computer system 100 consists of a plurality of users or clients $170_1$–$170_n$, a communication or network interface 160, one or more servers 110 and a plurality of input/output devices 180, e.g.,,peripheral devices.

Each of the users or clients $170_1$–$170_n$ can be one or more hardware devices, e.g., a mainframe, a workstation, a personal computer, or a terminal. Alternatively, each of the users can be a software application or process residing in the memory of a hardware device.

The users $170_1$–$170_n$ access other resources within the distributed computer system 100 via the network interface 160. The network interface 160 may comprise a communication adapter, e.g., a local area network (LAN) adapter employing one or more of the various well-known communication architectures and protocols, e.g., the transmission control protocol/internet protocol (TCP/IP). For example, the network interface 160 (or portions thereof) can be implemented using the "Server Message Block" (SMB) protocol, such that the network interface 160 can be referred to as a "SMB redirector". The SMB protocol was developed by Microsoft Corporation of Redmond, Wash., and Intel Corporation of Santa Clara, Calif. The SMB protocol allows a set of users, e.g., a set of computers, to access shared resources from a remote server as if the resources were situated locally to the users.

In turn, the network interface 160 is coupled to one or more servers $110_n$ that control access to a plurality of peripheral devices 180 (resources). Namely, the server 110 is coupled to a plurality of peripheral devices 180 that are accessible to all the users $170_1$–$170_n$. The peripheral devices 180 may include, but are not limited to, a plurality of physical drives (e.g., hard drives, floppy drives, tape drives, memory cards, compact disk (CD) drive), a printer, a monitor, and the like. These peripheral devices should be broadly interpreted to include any resources or services that are available to a user through a particular server.

The server 110 may comprise a general-purpose computer having a central processing unit (CPU) 120 and a memory 130 (e.g., random access memory, read only memory and the like) for managing communication and servicing user requests. More specifically, an operating system 140 and a server process 150 are loaded and executed in the memory 130. Additionally the a data structure 154 containing the configuration parameters are shown in memory 130 as a component of the server process 150. The configuration parameters define the operation of the server process 150 and include such parameters as priority, maximum connections, etc.

Once the server process 150 is executed in the memory 130, server 110 can then begin accepting client connections and service any client requests. It should be noted that additional software applications or modules can be executed, as required, in the memory 130, e.g., additional server processes, services or client requests. As such, the server process configuration method as discussed below in FIG. 2 and the data structure 154 of the configuration parameters of FIG. 1 can be stored on a computer readable or a signal bearing medium and loaded into the memory 130 during execution. Alternatively, all or part of the server process configuration method and/or the data structure can be implemented as a combination of software and hardware, e.g., using application specific integrated circuits (ASIC).

Although a specific hardware configuration is shown for distributed computer system 100, a preferred embodiment of the present invention can apply to any client-server hardware configuration, regardless of whether the computer system is a complicated, multi-user computing apparatus, a single-user workstation, or a network appliance that does not have non-volatile storage of its own.

In the preferred embodiment, the configuration information of the server process 150 is updated without the need to end and restart the server process 150. In other words, the server process 150 continues to operate and reside in the memory, while its configuration information is automatically updated. In cases where a determination is made that no server process is currently executing, a newly executed server process begins accepting requests and is configured with the desired configuration information. In the case where a determination is made that an existing server process is executing, the existing server process configuration is updated with information provided by a new server. In one embodiment, the determination of whether an existing server is executing involves a new server process issuing a request to the existing server process in the manner of a client process. The existing server process will then return an accept command, assuming the request is from an acceptable location. In another embodiment, the new server process attempts to bind to a port of interest. The binding will either be successful in the event that no other server process is currently bound to the port and will otherwise be unsuccessful. Other embodiments will be apparent to those skilled in the art.

Figure 2:
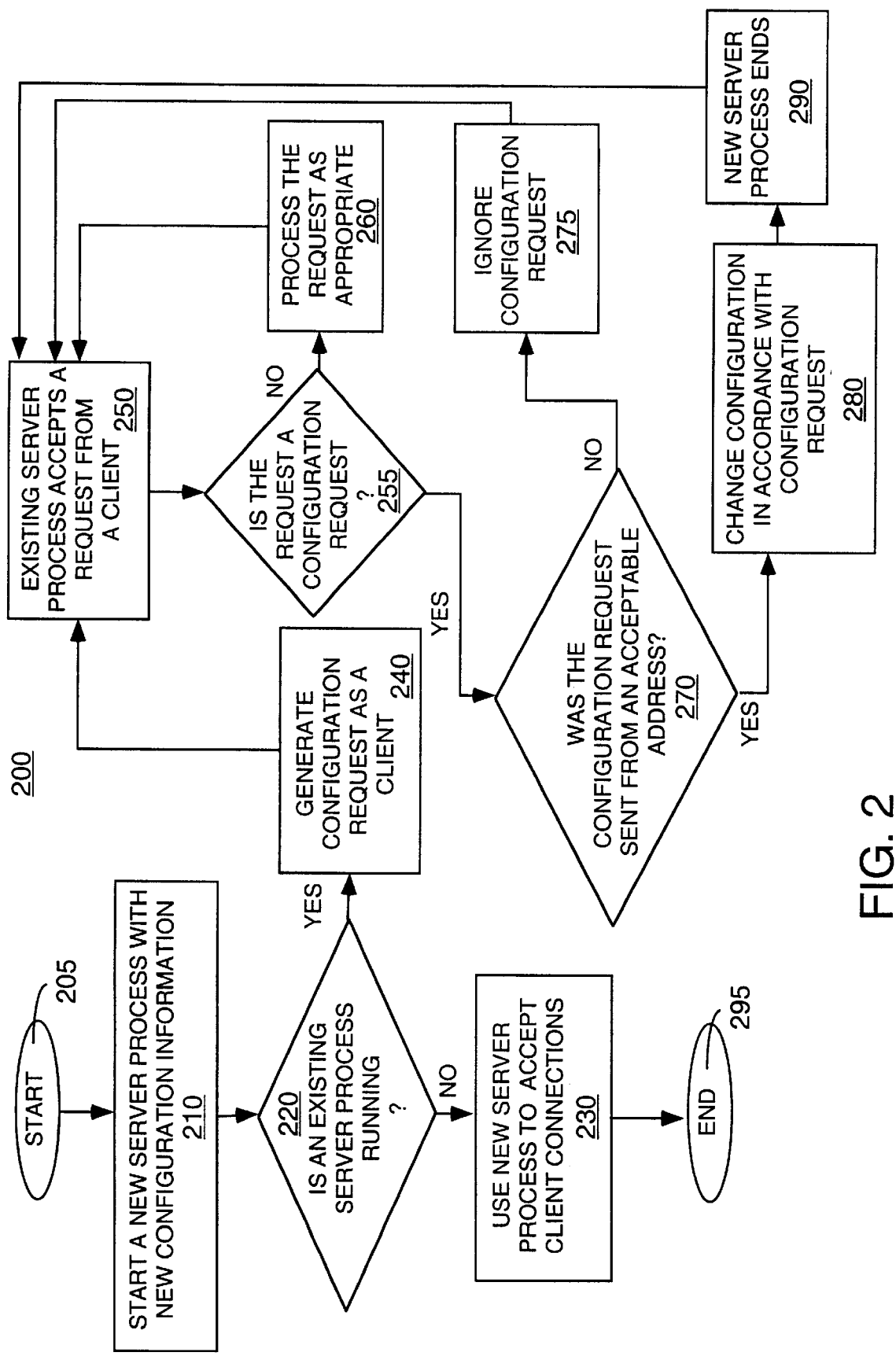
FIG. 2 is a flowchart of a method for configuring a server process without the need to end and restart the server process of the present invention.

From time to time, a server administrator may want to update the configuration of an existing server process, such as server process 150 executing on the server 110 with current configuration information 154. FIG. 2 illustrates a flowchart of a method 200 for configuring a server process without the need to end and restart an existing server process. Method 200 starts in step 205 and proceeds to step 210 where a new server process is installed with new configuration information. The new server process may be installed from one of the clients 170n, for example, and may be executed on the client machine or any other location on the network. Thus, the server administrator is provided with the convenience and freedom of starting a new server process without having to search or confirm the old configuration information, or even having to determine if an existing server process is already in operation. Installing the new server process can be done by conventional methods such as executing the server process using the server name in combination with an install command line.

In step 220, method 200 queries whether an existing server process is running. In general, this involves determining whether the existing sever is listening to a particular port. A port is simply a unique address used within a host to differentiate between multiple processes using the same protocol and address. The port number can be determined when the server process is installed by any known and unknown methods such as by a bind system call. Since ports are protocol specific, the server process preferably offers multiple protocol support and, accordingly, binds to multiple ports. Once the server process has been bound to a port, it can issue a listen command indicating that the server process is ready to accept connections. In one embodiment, the query at step 220 can then determine which port the existing server is listening to by attempting to issue a request from the new server process to a particular server communication port. This may involve the new server process contacting a Remote Procedure Call Daemon (RPCD). If an existing server process is bound to the particular port being accessed by the method 200 at step 220, the method 200 will return a transmission to that effect in the form of, for example, an accept command from the existing server, thereby determining that the existing server process is executing. If the existing sever process is not bound to the particular port being accessed by the new server process, an exception will be returned to the new server process. In another embodiment, the new server process may simply attempt to bind to the port of interest. A successful attempt indicates that no existing server is bound to the port, which is presumably exclusive. If the attempt is unsuccessful, then a determination is made that an existing server is bound to the port.

It should be noted that other determination methods can be employed to detect whether an existing server process is executing. For example, although not preferred, the method 200 could determine the existence of a file or object created at the time the server process was installed. The particular technique and protocol is not limiting of the invention. Further, the data structure containing the new, or updated, configuration information may be contained on the same data structure as the commands to perform step 220 or may contained on a separate data structure depending on the particular implementation.

If the query at step 220 is answered negatively, then method 200 proceeds to step 230 where the new server process becomes the current server process configured with the new configuration information and begins accepting client connections. Method 200 then ends in step 295.

If the query in step 220 is answered positively, then method 200 proceeds to step 240 where the new server process assumes the role of a client by issuing a configuration request. An illustrative data structure 300 of the configuration request is shown in FIG. 3. The data structure 300 generally includes the necessary commands to implement the configuration information according to method 200 described above. Thus, an identifier 310 indicating to the existing server the nature of the request is provided. Additionally, the data structure 300 includes the new configuration information 312 to be implemented. Such information may include, for example, the maximum number of connections the server process will accept, the home directory, the level of priority, etc. The particular configuration information is not limiting of the invention and depends on the server to be implemented.

Upon accepting the configuration request, the new configuration information included with the request is used to update the old configuration information of the existing server process. Accordingly, the existing server process may continue to operate without having to end and restart, thereby avoiding downtime. Additionally, method 200 avoids a conflict between two server processes operating simultaneously with different configuration parameters.

In step 250, the existing server process operates to receive any client requests. For example, the existing server process monitors one or more communication ports for client requests.

In step 255, method 200 queries whether a received client request is a configuration request before servicing the client request. If the query is negatively answered, then method 200 proceeds to step 260, where the client request is serviced accordingly. Method 200 then returns to step 250 and awaits the next client request. If the query is positively answered, then method 200 proceeds to step 270.

In step 270, method 200 optionally queries whether a received configuration request is from an acceptable address or location, because it may be desirable for security reasons to only service configuration requests having a particular address. For example, an existing server process can be designed such that only configuration requests from a "local computer" (e.g., from the server itself) will be accepted and processed. It should be noted that the term "local computer" may actually encompass a network of local or remote computers that a server administrator may deem to be adequately secured to allow configuration requests to be accepted from such locations. One reason for this optional security measure is to prevent a client from changing sensitive configuration information that may compromise the performance or security of a server. For example, it is undesirable to allow an Internet user to be able to generate a configuration request to alter the configuration of a server process. However, if security is not an issue in a particular client-server environment, then steps 270 and 275 can be omitted.

Returning to step 270, if the query is negatively answered, then method 200 proceeds to step 275, where the configuration request is ignored. Method 200 then returns to step 250 and awaits the next client request. If the query is positively answered, then method 200 proceeds to step 280, where the configuration of the existing server process is changed in accordance with the configuration request. In one embodiment, the current configuration information 154 of the existing server is stored on the machine executing the server process. Accordingly, updating the information involves accessing the data structure containing the current information and manipulating the information to conform to the configuration request. The data structure may reside in memory, such as memory 130 in FIG. 1, or may be stored in a file located on any of known machine readable mediums and is accessible only to the existing server process.

Once the configuration request is satisfied, method 200 proceeds to step 290 and ends the new server process. Optionally, a status message can be generated to inform the server administrator that the configuration information has been updated before ending the new server process. Method 200 then returns to step 250 and awaits the next client request.

While the foregoing is directed to the preferred embodiment of the present invention, other and further embodiments of the invention may be devised without departing from the basic scope thereof, and the scope thereof is determined by the claims that follow.

What is claimed is:

1. A method for configuring an existing server process having an old configuration information, comprising:
   (a) starting a new server process having a new configuration information;
   (b) detecting the existing server process in operation;
   (c) generating a configuration request in accordance with the new configuration information by the new server process; and (d) configuring the old configuration information in accordance with the configuration request.

2. The method of claim 1, further comprising:

(e) ending the new server process upon completion of the configuration request by the existing server process.

3. The method of claim 1, wherein the step (d) further comprises:

determining whether the configuration request from step (c) is from an acceptable location; and omitting the configuring step if the determining step determines the configuration request to be from an unacceptable location.

4. A signal-bearing medium containing a program for configuring an existing server process having an old configuration information, wherein the program, when read and executed by a computer, comprises:

(a) starting a new server process having a new configuration information;

(b) determining whether the existing server process is in operation;

(c) generating a configuration request by the new server process in accordance with the new configuration information if the existing server process is in operation; and (d) configuring the old configuration information of the existing server process in accordance with the configuration request.

5. The signal-bearing medium of claim 4, further comprising:

(e) ending the new server process upon completion of the configuration request by the existing server process.

6. The signal-bearing medium of claim 4, wherein the step (d) further comprises:

determining whether the configuration request from step (c) is from an acceptable location; and omitting the configuring step if the determining step determines the configuration request to be from an unacceptable location.

7. An apparatus for configuring a server process, comprising:

a first machine readable structure containing a first process having new configuration information, wherein the machine readable structure is adapted to determine whether a second process having old configuration information is executing on a server computer and wherein the first process is adapted to execute on the server computer if the second process is not executing and wherein the first process is adapted to reconfigure the second process if the second process is executing.

8. The apparatus of claim 7, wherein the second process is contained on a second machine readable structure.

9. The apparatus of claim 7, wherein the first machine readable structure is adapted to end the first process upon completion of the reconfiguration of the second process.

10. The apparatus of claim 7, wherein the second process is adapted to determine whether the configuration request is from an acceptable location.

11. The apparatus of claim 7, wherein the first process executes on a client computer connected to the server computer via a network.

12. The apparatus of claim 7, wherein the first process executes on the server computer.

13. A computer system for reconfiguring a server process, comprising:

a client process executing on the computer system and including:

a first machine readable data structure containing configuration information;

a second machine readable data structure adapted to determine whether the server process is executing on the computer system and, if so, updating configuration parameters of the server process with the configuration information without restarting the server.

14. The system of claim 13, wherein the first machine readable structure and the second machine readable structure are the same.

15. The system of claim 13, wherein the second machine readable structure is adapted to bind the client process to a port and begin accepting requests when the server process is not executing on the computer system.

16. The system of claim 13, wherein the second machine readable structure is adapted to terminate the client process upon reconfiguration of the server process.

17. The system of claim 13, wherein the server process is adapted to determine whether the client process is executing from an acceptable location and, if so, to accept a request containing the configuration information from the client.

18. The system of claim 13, wherein the second machine readable structure is adapted to determine whether the server process is executing on the computer system by listening to a port.

19. The system of claim 13, wherein the client process and the server process are connected via a network.

20. The system of claim 13, wherein the server process and the client process execute on a common host.

* * * * *